United States Patent
Ganesh et al.

(10) Patent No.: US 11,593,126 B1
(45) Date of Patent: Feb. 28, 2023

(54) IMPLEMENTATION FOR A HETEROGENEOUS DEVICE

(71) Applicant: Xilinx, Inc., San Jose, CA (US)

(72) Inventors: Sai Kiran Y Ganesh, Hyderabad (IN);
Devi Vara Prasad Bandaru, Hyderabad (IN); Chaitanya Kamarapu, Hyderabad (IN); Vijaya Raghava Rao Dasyam, Hyderabad (IN); Appa Rao Nali, Hyderabad (IN); Vidhumouli Hunsigida, Hyderabad (IN)

(73) Assignee: Xilinx, Inc., San Jose, CA (US)

( * ) Notice: Subject to any disclaimer, the term of this patent is extended or adjusted under 35 U.S.C. 154(b) by 297 days.

(21) Appl. No.: 16/928,619

(22) Filed: Jul. 14, 2020

(51) Int. Cl.
  *G06F 8/41* (2018.01)
  *G06F 9/445* (2018.01)

(52) U.S. Cl.
  CPC ............ *G06F 9/44589* (2013.01); *G06F 8/41* (2013.01)

(58) Field of Classification Search
  CPC .............................. G06F 8/41; G06F 9/44589
  USPC ........ 714/37, 38.1, 25, 48; 717/37, 38.1, 25, 717/48
  See application file for complete search history.

(56) References Cited

U.S. PATENT DOCUMENTS

| | | | | |
|---|---|---|---|---|
| 9,015,646 | B2 * | 4/2015 | Alfieri | G06F 30/327 716/136 |
| 10,177,977 | B1 * | 1/2019 | Avramov | H04L 41/0809 |
| 10,289,785 | B1 | 5/2019 | Panou | |
| 11,272,007 | B2 * | 3/2022 | Dreyband | H04L 67/1097 |
| 11,301,492 | B1 * | 4/2022 | Engers | G06F 16/245 |
| 2005/0261850 | A1 * | 11/2005 | Goodman | G11B 15/68 702/85 |
| 2012/0216179 | A1 * | 8/2012 | Sharma | G16H 10/60 717/168 |
| 2013/0311796 | A1 | 11/2013 | Brinks et al. | |
| 2018/0032734 | A1 * | 2/2018 | Gunti | G06F 21/575 |
| 2019/0324806 | A1 | 10/2019 | Javre et al. | |
| 2021/0256938 | A1 * | 8/2021 | Xu | G09G 5/377 |
| 2021/0286616 | A1 * | 9/2021 | Singh | G06F 8/24 |
| 2022/0103525 | A1 * | 3/2022 | Shribman | H04L 67/56 |

FOREIGN PATENT DOCUMENTS

WO     2016077393 A1     5/2016

OTHER PUBLICATIONS

Title: Mapping a domain specific language to a platform FPGA, author: C Kulkarni, published on 2004.*

(Continued)

*Primary Examiner* — Chameli Das
(74) *Attorney, Agent, or Firm* — Kevin T. Cuenot

(57) ABSTRACT

Implementing a design for a heterogeneous device can include mapping, using computer hardware, a plurality of applications of a design for a device to a plurality of domains of the device, wherein each domain includes a different compute unit, performing, using the computer hardware, validity checking on the plurality of applications, detecting, using the computer hardware, a conflict between two or more of the plurality of applications from the validity checking, and, in response to the detecting, generating a notification of the conflict using the computer hardware. Operations such as automatically generating a boot image, debugging, and/or performing system level performance analysis may also be performed.

20 Claims, 8 Drawing Sheets

(56) References Cited

OTHER PUBLICATIONS

Title: Domain specific mapping for solving graph problems on reconfigurable devices; author: A Dandalis, pubslished on 1999.*
Title: Integrated circuit security threats and hardware assurance countermeasures, author: Karen Mercedes Goertzel, published on 2013.*
Title: An industry-compliant immunity modeling technique for integrated circuits F Lafon et al, published on 2009.*
WIPO Appln. PCT/US2019/021571, International Search Report and the Written Opinion, dated Jun. 4, 2019, 13 pg.
Specification and drawings for U.S. Appl. No. 15/266,963, filed Sep. 15, 2016, Panou.
Sanders, Lester, "Isolation Methods in Zynq UltraScale+ MPSoCs," XAPP1320 (v1 .0), Jul. 26, 2017, 42 pp., Xilinx, Inc., San Jose, California, USA.

* cited by examiner

400

| Application | Build Config. | Domain | Processor | OS | Build Dependency | Boot on Startup |
|---|---|---|---|---|---|---|
| video_lib | Debug | linux_on_a72 | psv_cortexa72 | Linux | - | No |
| stream_lib | Debug | linux_on_a72 | psv_cortexa72 | Linux | - | No |
| classifier | Debug | dpe | DPE | DPE Runtime | - | Yes |
| video_processing_app | Debug | linux_on_a72 | psv_cortexa72 | Linux | video_lib; stream_lib | No |
| multipler | Debug | dpe | DPE | DPE Runtime | - | No |
| heartbeat_app | Debug | freeRTOS_on_r5_0 | psv_cortex_r5_0 | FreeRTOS | - | Yes |

FIG. 4

IMPLEMENTATION FOR A HETEROGENEOUS DEVICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to integrated circuits (ICs) and, more particularly, to implementing software capable of running on ICs having a heterogeneous architecture.

BACKGROUND

Some integrated circuits (ICs), referred to as heterogeneous ICs or heterogeneous devices, include a plurality of different compute units. Whether formed of a single die or a plurality of interconnected dies, a heterogeneous device may be provided as a single package. The different compute units may differ from one another in terms of architecture, instructions set, and/or may be designed for different purposes. Heterogeneous devices, using these different compute units, are capable of executing multiple applications concurrently.

SUMMARY

In one aspect, a method can include mapping, using computer hardware, a plurality of applications of a design for a device to a plurality of domains of the device, wherein each domain includes a different compute unit, performing, using the computer hardware, validity checking on the plurality of applications, detecting, using the computer hardware, a conflict between two or more of the plurality of applications from the validity checking, and, in response to the detecting, generating a notification of the conflict using the computer hardware.

In another aspect, a system includes a processor configured to initiate operations. The operations can include mapping a plurality of applications of a design for a device to a plurality of domains of the device, wherein each domain includes a different compute unit, performing validity checking on the plurality of applications, detecting a conflict between two or more of the plurality of applications from the validity checking, and, in response to the detecting, generating a notification of the conflict.

In another aspect, a computer program product includes one or more computer readable storage media, and program instructions collectively stored on the one or more computer readable storage media. The program instructions are executable by computer hardware to initiate operations. The operations can include mapping a plurality of applications of a design for a device to a plurality of domains of the device, wherein each domain includes a different compute unit, performing validity checking on the plurality of applications, detecting a conflict between two or more of the plurality of applications from the validity checking, and, in response to the detecting, generating a notification of the conflict.

Other aspects of the inventive arrangements, whether implemented as a method, a system, and/or a computer program product, can include operations such as, for example, automatically generating a boot image, debugging, and/or performing system level performance analysis.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 4 illustrates an example user interface that may be generated by a computer system to create a specification for a boot image of a heterogeneous device.

DETAILED DESCRIPTION

Figure 1:
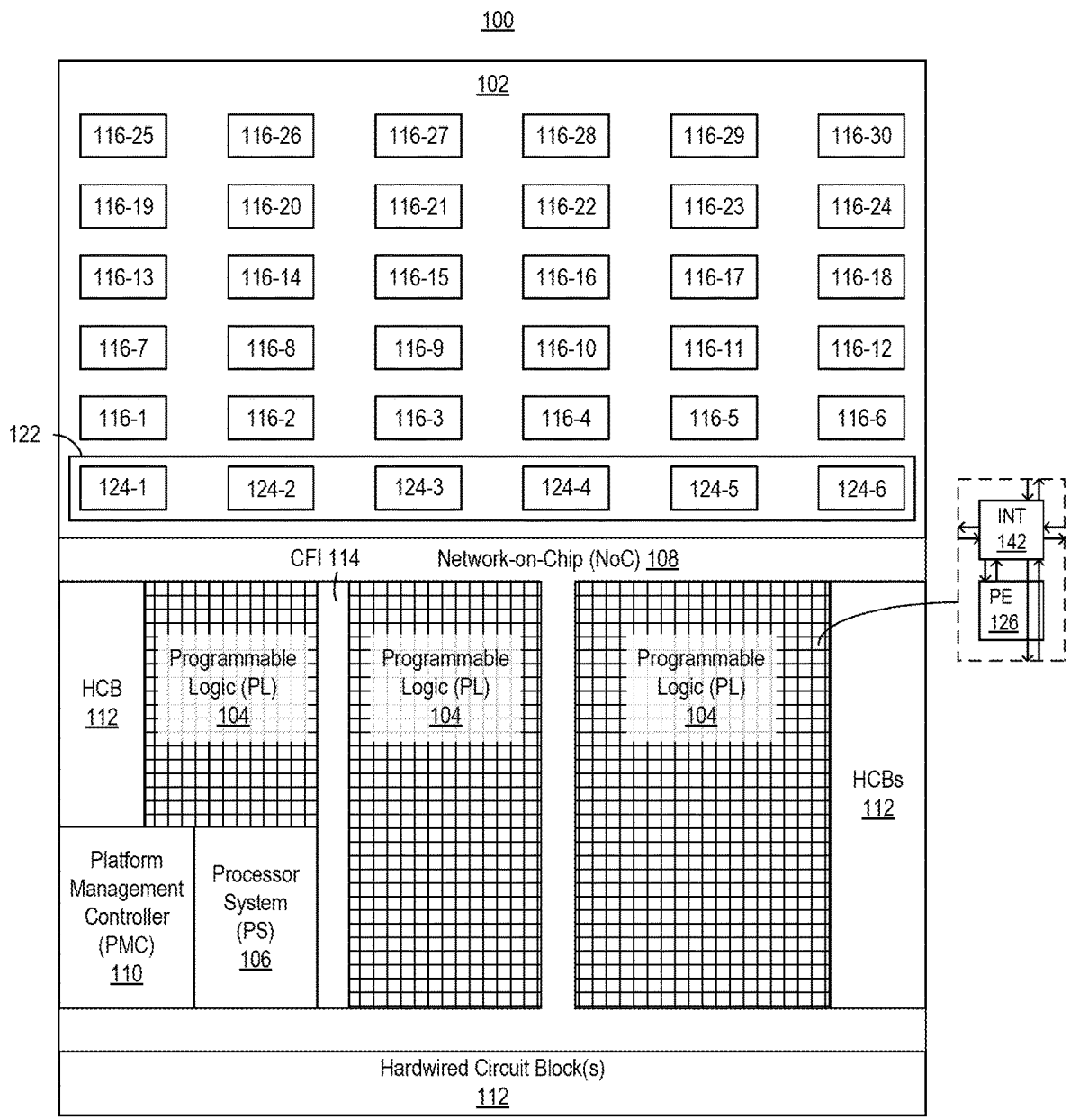
FIG. 1 illustrates an example architecture for a heterogeneous device.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to implementing software capable of running on ICs having a heterogeneous architecture. A heterogeneous device, e.g., a device having a heterogeneous architecture, refers to an IC that includes a plurality of different compute units. These compute units may differ in terms of architecture, instruction set, and/or intended purpose. In creating a design for a heterogeneous device, users typically create an application for each different compute unit in the heterogeneous device individually. That is, a user creates a first application intended to run on one compute unit of the heterogeneous device, a second application intended to run on a second compute unit of the heterogeneous device, and so forth. Taken collectively, these different applications constitute the design intended to run or execute on the heterogeneous device.

Because the applications are developed on an individual basis, certain dependencies and conflicts between the applications may go unnoticed by the user(s) during development. An example of a conflict may be that two of the applications overlap in runtime memory such that one application overwrites the other, or a portion of the other, at runtime. Another example of a conflict may be that two applications are attempting to access a same circuit resource of the heterogeneous device concurrently. These sorts of conflicts may be observable at runtime of the design in the heterogeneous device in the form of unexpected device behavior. The particular cause of the behavior, e.g., the conflict, may not be clearly discerned from the behavior itself. In fact, it may not be at all clear that the cause of the unexpected device behavior is one or more of the example conflicts mentioned above.

In accordance with the inventive arrangements described within this disclosure, a computer-based electronic design automation (EDA) system (EDA system) is provided that is capable of facilitating the implementation of a design for a heterogeneous device. The design includes a plurality of different applications. The EDA system is capable of performing a variety of functions including, for example, validation across the various applications that, taken collectively, form the design. The EDA system is also capable of automatically generating a boot image for the design that may be loaded into the heterogeneous device. The boot image may include selected components used to boot the heterogeneous device based on a user-provided specification.

By detecting conflicts among applications, the time for creating and debugging a design for a heterogeneous device may be reduced. For example, conflicts that manifest themselves as odd or unexpected device behavior may be detected during the development process rather than later when each of the applications forming the design is loaded into the device for testing and/or debugging. As noted, these conflicts may not be detected with when evaluating or analyzing each application in isolation. When analyzing the design across the constituent applications, the system is capable of detecting the conflicts.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example architecture for a heterogeneous device (device) 100. Device 100 is also an example of a programmable IC, an adaptive system, and a System-on-Chip (SoC). In the example of FIG. 1, device 100 is implemented on a single die provided within a single package. In other examples, device 100 may be implemented using a plurality of interconnected dies within a single package where the various resources of device 100 (e.g., circuits) illustrated in FIG. 1 are implemented across the different interconnected dies.

In the example, device 100 includes a plurality of different subsystems including a data processing engine (DPE) array 102, programmable logic (PL) 104, a processor system (PS) 106, a Network-on-Chip (NoC) 108, a platform management controller (PMC) 110, and one or more hardwired circuit blocks 112. A configuration frame interface (CFI) 114 is also included.

DPE array 102 is implemented as a plurality of interconnected and programmable data processing engines (DPEs) 116. DPEs 116 may be arranged in an array and are hardwired. Each DPE 116 can include one or more cores and a memory module. In one example implementation, cores of the DPEs 116 may be implemented as custom circuits that do not execute program code.

In another example implementation, cores of DPEs 116 are capable of executing program code stored in core-specific program memories contained within each respective core. As an example, a core of a DPE 116 may be implemented as a vector processor capable of performing both fixed and floating-point operations and/or a scalar processor. Each DPE 116 further includes a data memory (e.g., the memory module) and dedicated multi-bit data movement channels connecting the DPEs 116. Each DPE 116 further can include support for direct memory access (DMA) operations and locks to move data to and from other DPEs 116.

DPE array 102 may be configured to form a plurality of clusters, where each cluster includes one or more DPEs 116. DPEs 116 in a same cluster may communicate with one another to implement a particular application. Clusters may operate in isolation from one another where each different cluster is capable of running a cluster-specific application (or different instance of an application run in another cluster). Each cluster operates as part of a domain of device 100.

It should be appreciated that the number of DPEs 116 illustrated in FIG. 1 is for purposes of illustration. DPE array 102 may include more DPEs 116 than shown where DPE array 102 includes more rows of DPEs 116 and/or more columns of DPEs 116. For example, in some cases, DPE array 102 may include hundreds of DPEs 116. In other examples, DPE array 102 may include fewer DPEs 116 than shown in FIG. 1.

DPE array 102 includes an interface block 122 that connects DPEs 116 to other resources of device 100. In the example of FIG. 1, interface block 122 includes a plurality of interconnected tiles 124 organized in a row. In one example, each of tiles 124 may have a same architecture. In another example, tiles 124 may be implemented with different architectures where each different tile architecture supports communication with different types of resources of device 100. Tiles 124 are connected so that data may be propagated from one tile to another bi-directionally. Each tile 124 is capable of operating as an interface for the column of DPEs 116 directly above.

PL 104 is circuitry that may be programmed to perform specified functions. As an example, PL 104 may be implemented as field programmable gate array type of circuitry. PL 104 can include an array of programmable circuit blocks. As defined herein, the term "programmable logic" means circuitry used to build reconfigurable digital circuits. Programmable logic is formed of many programmable circuit blocks that provide basic functionality. The topology of PL 104 is highly configurable unlike hardwired circuitry. Each programmable circuit block of PL 104 typically includes a programmable element 126 (e.g., a functional element) and a programmable interconnect 142. The programmable interconnects 142 provide the highly configurable topology of PL 104. The programmable interconnects 142 may be configured on a per wire basis to provide connectivity among the programmable elements 126 of programmable circuit blocks of PL 104 and is configurable on a per-bit basis (e.g., where each wire conveys a single bit of information) unlike connectivity among DPEs 116, for example.

Examples of programmable circuit blocks of PL 104 include configurable logic blocks having look-up tables and registers. Unlike hardwired circuitry described below and sometimes referred to as hardwired circuit blocks, these programmable circuit blocks have an undefined function at the time of manufacture. PL 104 may include other types of programmable circuit blocks that also provide basic and defined functionality with more limited programmability. Examples of these circuit blocks may include digital signal processing blocks (DSPs), phase lock loops (PLLs), and block random access memories (BRAMs). These types of programmable circuit blocks, like others in PL 104, are numerous and intermingled with the other programmable circuit blocks of PL 104. These circuit blocks may also have an architecture that generally includes a programmable interconnect 142 and a programmable element 126 and, as such, are part of the highly configurable topology of PL 104.

Prior to use, PL 104, e.g., the programmable interconnect and the programmable elements, must be programmed or "configured" by loading data referred to as a configuration bitstream into internal configuration memory cells therein. The configuration memory cells, once loaded with a configuration bitstream, define how PL 104 is configured, e.g., the topology, and operates (e.g., particular functions performed). Within this disclosure, a "configuration bitstream" is not equivalent to program code executable by a processor or computer.

PS 106 is implemented as hardwired circuitry that is fabricated as part of device 100. PS 106 may be implemented as, or include, any of a variety of different processor types each capable of executing program code. For example, PS 106 may be implemented as an individual processor, e.g., a single core capable of executing program code. In another example, PS 106 may be implemented as a multi-core processor. In still another example, PS 106 may include one or more cores, modules, co-processors, I/O interfaces, and/or other resources. PS 106 may be implemented using any of a variety of different types of architectures. Example architectures that may be used to implement PS 106 may include, but are not limited to, an ARM processor architecture, an x86 processor architecture, a graphics processing unit (GPU) architecture, a mobile processor architecture, a DSP architecture, combinations of the foregoing architectures, or other suitable architecture that is capable of executing computer-readable instructions or program code.

NoC 108 is a programmable interconnecting network for sharing data between endpoint circuits in device 100. The endpoint circuits can be disposed in DPE array 102, PL 104, PS 106, and/or selected hardwired circuit blocks 112. NoC 108 can include high-speed data paths with dedicated switching. In an example, NoC 108 includes one or more horizontal paths, one or more vertical paths, or both horizontal and vertical path(s). The arrangement and number of regions shown in FIG. 1 is merely an example. NoC 108 is an example of the common infrastructure that is available within device 100 to connect selected components and/or subsystems.

Nets that are to be routed through NoC 108 are unknown until a design is created for implementation within device 100. NoC 108 may be programmed by loading configuration data into internal configuration registers that define how elements within NoC 108 such as switches and interfaces are configured and operate to pass data from switch to switch and among the NoC interfaces to connect the endpoint circuits. NoC 108 is fabricated as part of device 100 (e.g., is hardwired) and, while not physically modifiable, may be programmed to establish connectivity between different master circuits and different slave circuits of a user circuit design. NoC 108, upon power-on, does not implement any data paths or routes therein. Once configured by a master circuit such as PMC 110, however, NoC 108 implements data paths or routes between endpoint circuits.

PMC 110 is responsible for managing device 100. PMC 110 is a subsystem within device 100 that is capable of managing the other programmable circuit resources across the entirety of device 100. PMC 110 is capable of maintaining a safe and secure environment, booting device 100, and managing device 100 during normal operations. For example, PMC 110 is capable of providing unified and programmable control over power-up, boot/configuration, security, power management, safety monitoring, debugging, and/or error handling for the different subsystems of device 100 (e.g., DPE array 102, PL 104, PS 106, and NoC 108). PMC 110 operates as a dedicated platform manager that decouples PS 106 and from PL 104. As such, PS 106 and PL 104 may be managed, configured, and/or powered on and/or off independently of one another.

In one aspect, PMC 110 is capable of operating as a Root-of-Trust for the entirety of device 100. As an example, PMC 110 is responsible for authenticating and/or validating device images containing configuration data for any of the programmable resources of device 100 that may be loaded into device 100. PMC 110 further is capable of protecting device 100 against tampering during operation. By operating as the Root-of-Trust for device 100, PMC 110 is capable of monitoring operation of PL 104, PS 106, and/or any other programmable circuit resources that may be included in device 100. The Root-of-Trust capabilities, as performed by PMC 110, are distinct and separate from PS 106 and PL 104 and/or any operations performed by the PS 106 and/or PL 104.

In one aspect, PMC 110 may be implemented as a processor with dedicated resources. PMC 110 may include multiple redundant processors. The processors of PMC 110 are capable of executing firmware. Use of firmware supports configurability and segmentation of global features of device 100 such as reset, clocking, and protection to provide flexibility in creating separate domains (which are distinct from "power domains" that may be subsystem-specific).

Hardwired circuit blocks 112 are special-purpose circuit blocks fabricated as part of device 100. Though hardwired, hardwired circuit blocks 112 may be configured by loading configuration data into control registers to implement one or more different modes of operation. Examples of hardwired circuit blocks 112 may include input/output (I/O) blocks, transceivers for sending and receiving signals to circuits and/or systems external to device 100, memory controllers, or the like. Examples of different I/O blocks may include single-ended and pseudo differential I/Os. Examples of transceivers may include high-speed differentially clocked transceivers. Other examples of hardwired circuit blocks 112 include, but are not limited to, cryptographic engines, digital-to-analog converters (DACs), analog-to-digital converters (ADCs), and the like. In general, hardwired circuit blocks 112 are application-specific circuit blocks.

CFI 114 is an interface through which configuration bitstream(s) may be provided to PL 104 to implement different user-specified circuits and/or circuitry therein. CFI 114 is coupled to, and accessible by, PMC 110 to provide configuration data to PL 104. In some cases, PMC 110 is capable of first configuring PS 106 such that PS 106, once configured by PMC 110, may provide configuration bitstream(s) to PL 104 via CFI 114. In one aspect, CFI 114 has a built in cyclic redundancy checking (CRC) circuitry (e.g., CRC 32-bit circuitry) incorporated therein. As such, any data that is loaded into CFI 114 and/or read back via CFI 114 may be checked for integrity by checking the values of codes attached to the data.

The various programmable circuit resources illustrated in FIG. 1 may be programmed initially as part of a boot process for device 100. During runtime, the programmable circuit resources may be reconfigured. In one aspect, PMC 110 is capable of initially configuring DPE array 102, PL 104, PS 106, and NoC 108. At any point during runtime, PMC 110 may reconfigure all or a portion of device 100. In some cases, PS 106 may configure and/or reconfigure PL 104 and/or NoC 108 once initially configured by PMC 110.

Figure 2:
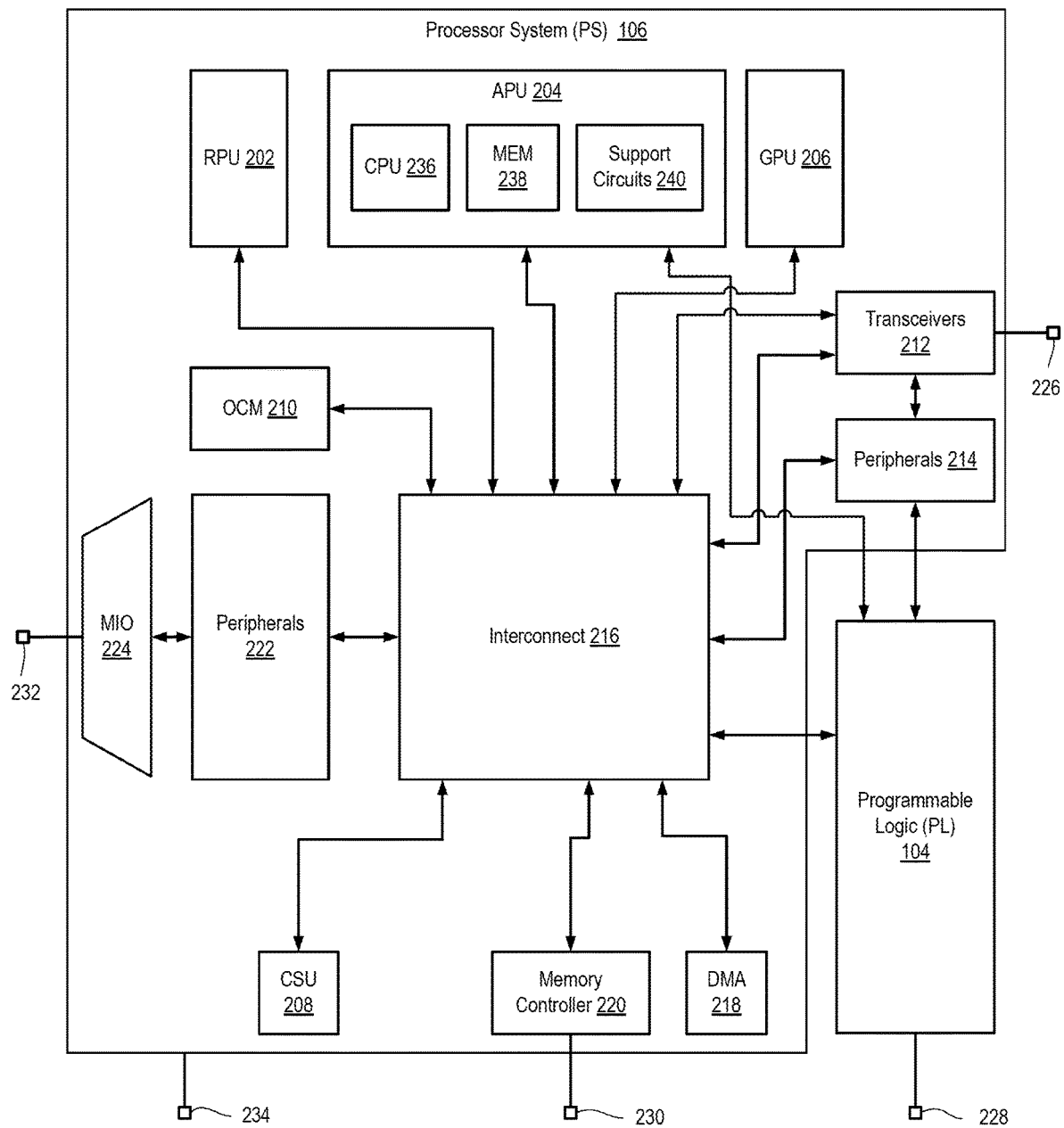
FIG. 2 illustrates an example implementation of a subsystem of a heterogeneous device having multiple processors.

FIG. 2 illustrates an example implementation of PS 106 of FIG. 1. In the example, PS 106 includes various processors such as a real-time processing unit (RPU) 202, an application processing unit (APU) 204, a graphics processing unit (GPU) 206, a configuration and security unit (CSU) 208, and the like. PS 106 also includes various support circuits, such as on-chip memory (OCM) 210, transceivers 212, peripherals 214, interconnect 216, DMA circuit 218, memory controller 220, peripherals 222, and multiplexed input/output (MIO) circuit 224. The processors and the support circuits are interconnected by interconnect 216. In the example of FIG. 2, PL 104 is also coupled to interconnect 216. Transceivers 212 may be coupled to external pins 226. PL 104 may be coupled to external pins 228. Memory controller 220 may be coupled to external pins 230. MIO 224 may be coupled to external pins 232. PS 106 may be coupled to external pins 234. APU 204 can include a CPU 236, memory 238, and support circuits 240.

In the example of FIG. 2, each of processors 202, 204, and 206 may include one or more central processing units (CPUs) and associated circuits, such as memories, interrupt controllers, direct memory access (DMA) controllers, memory management units (MMUs), floating point units (FPUs), and the like. Interconnect 216 includes various switches, busses, communication links, and the like configured to interconnect processors 202, 204, 206 and to interconnect the other components in PS 106 to processors 202, 204, and 206.

OCM 210 includes one or more RAM modules, which can be distributed throughout PS 106. For example, OCM 210 can include battery backed RAM (BBRAM), tightly coupled memory (TCM), and the like. Memory controller 220 can include a dynamic random access memory (DRAM) interface for accessing external DRAM. Peripherals 214, 222 can include one or more components that provide an interface to PS 106. For example, peripherals 222 can include a graphics processing unit (GPU), a display interface (e.g., DisplayPort, high-definition multimedia interface (HDMI) port, etc.), universal serial bus (USB) ports, Ethernet ports, universal asynchronous transceiver (UART) ports, serial peripheral interface (SPI) ports, general purpose 10 (GPIO) ports, serial advanced technology attachment (SATA) ports, PCIe ports, and the like. Peripherals 222 can be coupled to MIO 224. Peripherals 214 can be coupled to transceivers 212. Transceivers 212 can include serializer/deserializer (SERDES) circuits, MGTs, and the like.

Figure 3:
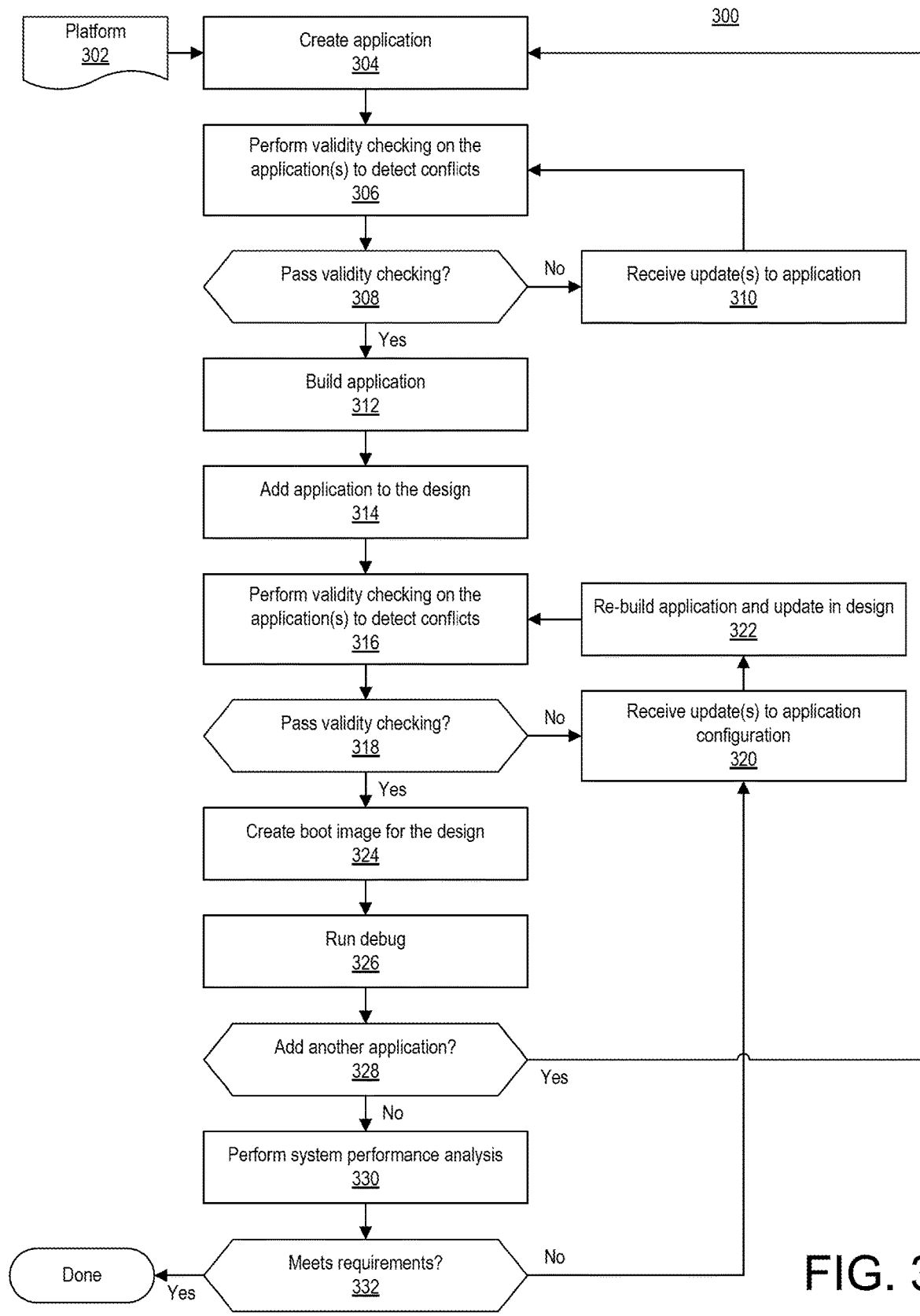
FIG. 3 illustrates an example method of implementing a design for a heterogeneous device.

FIG. 3 illustrates an example method 300 of implementing a design for a heterogeneous device. Method 300 may be implemented using a computer system (system) as described herein in connection with FIG. 9. The system is capable of executing one or more EDA applications that perform the operations described within this disclosure.

Method 300 may begin in a state where a platform 302 is received by the system. The term "platform" means a software description of a device on which one or more user applications are to run or execute. The platform specifies a definition of the device. The device is heterogeneous meaning that the device includes a plurality different compute units such as device 100 of FIG. 1. The platform defines the different resources included in the device and available for use by the design.

Applications developed for a heterogeneous device target specific compute units. Platform 302 defines the base hardware and software architecture of the heterogeneous device available for applications. Platform 302 provides a context for the applications that are to be developed. For example, platform 302 specifies availability of the particular compute units, external memory interfaces, custom input/output, and software runtime(s). Referring to the example of FIG. 1, compute units refer to processors and DPEs. In the case where DPEs are capable of executing program code, DPEs may be considered a type of processor. Examples of the software runtimes specified by platform 302 may include, but are not limited to, operating systems (which may include "bare metal"), boot loaders, drivers for platform peripherals, and a root file system. In one aspect, platform 302 may further specify a group of sub-systems of the device where each subsystem is defined by a compute unit and a target operating system.

In one aspect, platform 302 may be generated using a system as described in connection with FIG. 9. This allows a user to specify platform 302 for the applications of a design for the heterogeneous device. In one example implementation, platform 302 is specified as a package, e.g., a "container," where the platform appears as a single file but includes one or more files therein. In some cases, a package or container is also referred to as an archive file.

Platform 302 may include a hardware portion. The hardware portion may include a hierarchy of files and/or folders. For example, the hardware portion may include any Intellectual Properties (IPs) or "cores" that are used to implement interfaces in the device to the circuit board on which the device is coupled. The hardware portion may also specify connectivity of these IPs to I/Os of the device. Platform 302 may also include a software portion that is created based on the hardware portion. The software portion may define the different domains of the device that correspond to the various compute units of the heterogeneous device. The user, in generating platform 302, is capable of defining an operating system for each domain. Working through the system and using platform 302, for example, users are capable generating applications for the different domains of the device.

In one or more embodiments, the term "domain" refers to a combination of a compute unit and an operating system to be executed by the compute unit (e.g., a "target operating system") of the device. Each domain may include a subset of the resources available on the device. Thus, each domain is capable of running one or more applications. In some cases, a domain is the same as a subsystem. Examples of domains may include, but are not limited to, DPE array 102 and the runtime for DPE array 102, a single APU (e.g., compute unit) with bare metal libraries, and/or multiple APUs with a Linux operating system. For instance, a domain may be defined to include the entirety of DPE array 102. In other cases, a domain is defined to include a portion of a subsystem. For example, a domain may include only a selected processor of PS 106 (RPU 202 or the APU 204) or only a subset of DPEs 116 of DPE array 102 (e.g., where DPE array 102 may be partitioned into multiple domains). In another example, a domain may include a portion of PL 104 that is configured to implement a "soft processor." A "soft processor" is a processor capable of executing program code that is implemented using programmable logic.

The term "application" refers to executable program code, configuration data which may include configuration bitstream(s), or a combination thereof for the device that is intended to run or execute in a particular domain. For example, an application may include user program code and/or an operating system. Within this disclosure, the term "bare metal" refers to an application that runs in a domain without a formal operating system. That is, the application is created to incorporate desired user-specified functionality as well as functionality (e.g., input/output) typically ascribed to an operating system such as Linux. For this reason, within this disclosure, the term "bare metal," in addition to describing an application, also indicates that the application executes on a processor without an operating system.

In another example, an application may include program code that is intended to be executed by a soft processor implemented in PL 104 of the device. The soft processor itself, as specified by a configuration bitstream (e.g., a full configuration bitstream or a partial configuration bitstream), may be included in the hardware portion of platform 302.

In block 304, an application is created. For example, a user working via the system is capable of writing or putting together an application for a compute unit of a particular domain. In one aspect, the application may include metadata, e.g., comments, pragmas, support file(s), etc., that indicate the particular domain of the heterogeneous device on which the application is intended to run. The metadata may further specify the particular compute unit of the domain (e.g., processor and/or DPEs) on which the application will execute or run and/or other attributes such as a particular operating system on which the application is to execute or run. For purposes of explanation, the application created in block 304 may be referred to as the "current application."

In block 306, the system is capable of performing validity checking on the current application to detect conflicts. The validity checking performed in block 306 effectively compares attributes of the current application with attributes of other applications that have already been created and added to the design for the heterogeneous device. Since method 300 is iterative in nature, the system has a view of, e.g., is aware of, each of the applications created thus far and added to the design for the heterogeneous device. In this regard, the system is capable of performing the validity checking on the current application with reference to each of the other applications that may have been created and included in the design for the heterogeneous device. In checking for conflicts, the system takes a higher level view of the design across applications to check for the conflicts.

In one aspect, the validity checking performed by the system includes determining whether more than one application (e.g., of those applications that have been created for and/or added to the design) is assigned to use a same processor during boot of the heterogeneous device. For example, the system is capable of detecting a conflict where a set of two or more applications of the design are designated to execute on a same processor of the heterogeneous device during startup, wherein one or more of the applications of the set is designated as a bare metal application (e.g., has a bare metal operating system). The system may only perform this validity check for processors of the heterogeneous device excluding the DPEs. In the case where one or more of the applications intended to execute on a same processor of the heterogeneous device is a bare metal application, no other application may execute concurrently with the bare metal application on that processor. The system is capable of detecting conditions where two or more bare metal applications are designated to execute on a same processor during boot or startup of the device. In the case of a domain having a processor (e.g., other than the DPEs) that uses an operating system such as Linux, for example, the operating system allows the processor to execute two or more applications concurrently. In that case, the system does not detect a conflict. That is, when a domain executes an operating system, the system presumes that the two applications are written to co-exist in the domain.

In another aspect, the validity checking performed by the system includes determining that two or more applications (e.g., of those applications that have been created for and/or included in the design) designated for implementation in DPE array 102 attempt to use the same DPE 116 concurrently. For example, DPE array 102 is capable of running more than one application therein concurrently. Still, these different applications may not share DPEs 116. Each application created to execute within the DPE array may have metadata as described herein that assigns the application to a particular DPE 116 or particular DPEs 116. A DPE 116 may only be used within one application and may not be shared among two or more applications. Thus, in cases where two or more applications designated for implementation in DPE array 102 attempt to use the same DPE 116, the system detects a conflict.

For example, a DPE application may be developed to include configuration data that informs a DPE compiler of the particular DPEs 116 (e.g., DPE cores) to be used by the DPE application. This information may be specified in the DPE application as a "DPE core range." The DPE compiler is capable of generating metadata during compilation of the DPE application. The metadata, for example, may also specify scheduling information for the DPE application. The scheduling information specifies which DPE cores are used by the DPE application and/or by different parts of the DPE application. The scheduling information further specifies when and/or how long (e.g., times) such DPE cores are used by the DPE application and/or parts thereof during runtime of the DPE application or parts thereof and/or the device in general. The DPE compiler, unlike the system described herein, does not have a view of multiple DPE applications. The system described herein is capable of analyzing and comparing the metadata of multiple DPE applications to detect conflicts therein. Thus, concurrent use of DPEs 116 by DPE applications may be detected in cases where the conflict is ongoing and in cases where the conflict is momentary.

In another example implementation, the system is capable of detecting conflicts relating to dependencies between applications and/or libraries as part of validity checking. An example of dependency checking is provided in connection with FIG. 4.

In block 308, the system determines whether the current application passes validity checking. In response to determining that the current application does not pass validity checking, e.g., that one or more conflicts were detected, method 300 proceeds to block 310. In one aspect, though not illustrated in FIG. 3, the system is capable of generating a notification indicating the types of conflicts that have been detected.

In block 310, the system is capable of receiving one or more updates to the current application. The updates to the current application may be provided from the user and change the designated processor and/or DPE(s) on which the application is to execute and/or the operating system, for example. After block 310, method 300 continues to block 306 to again perform validity checking using the updated version of the current application. In response to determining that the application does pass validity checking, method 300 continues to block 312.

In block 312, the system is capable of building the current application. The system, for example, is capable of compiling and linking the current application. In block 314, the system is capable of adding the current application built in block 312 to the design for the heterogeneous device.

In block 316, the system is capable of performing validity checking on the design to detect conflicts. In block 316, the system is capable of detecting one or more further conflicts in the design relating to creation of a boot image for the design. In block 316, for example, the system is capable of performing further validity checks by analyzing the design to detect conflicts including, but not limited to, memory overlaps between applications and peripheral conflicts. Memory overlaps refer to cases where two (or more) applications are utilizing the same portion or region of runtime memory concurrently. In such cases, the system is capable of generating a notification indicating the applications that overlap and the region of overlap in the memory. In an example implementation, the system may also determine the portion of each application that is overlapped. For example, the system may indicate that the main or core, the stack, and/or the heap section(s) of a first application overlap with a another application (and/or a particular section or sections of such other application).

Peripheral conflicts refer to situations where two or more applications are attempting to access a same circuit block of the heterogeneous device. For example, two or more applications may attempt to access a same memory controller and/or a same peripheral of PS 106, or a same hardwired circuit block of the heterogeneous device.

In block 318, the system determines whether the design passes validity checking. In response to determining that the design does not pass validity checking, e.g., that one or more conflicts were detected, method 300 proceeds to block 320.

In one aspect, though not illustrated in FIG. 3, the system is capable of generating a notification indicating the types of conflicts that have been detected. In some cases, the conflicts may be planned by the users. That is, two applications may have been designed to share the same region of memory for purposes of data sharing. In other cases, two or more applications may be designed to access the same peripheral(s) where each application is built to include safeguards that prevent the applications from concurrently accessing the peripheral(s).

The system is capable of indicating the applications in conflict and the item in conflict (e.g., memory or the peripheral(s)). The notification may include more detailed information such as the portion of each application that overlaps. By including more detailed information, a user is able to discern whether the detected conflict is one of concern or one that was planned with appropriate safeguards designed into the application(s). The user may ignore or correct the noted conflicts.

In block 320, the system is capable of updating the application configuration. In one aspect, for example, the system may receive one or more user inputs that specify updates to the board support package (BSP) for the design. In general, the BSP is a collection of libraries and drivers that form the lowest layer of the software stack of the design. The libraries may include software components such as standard C libraries (or libraries in other programming languages), device drivers for peripherals in the design, and/or other libraries including, but not limited to, a memory file system, other file systems, libraries for controlling other devices on the board with the heterogeneous device, a networking library, RTOSes and/or middleware stacks, etc.

In another aspect, for example, the system may receive an updated linker script for the design that corrects a detected memory overlap and/or corrects contention for one or more peripheral(s) of the heterogeneous device. After block 320, method 300 continues to block 322 where the system re-builds one or more applications and updates the design with the updated applications. After block 322, method 300 continues to block 316 perform validity checking on the updated design.

In response to determining that no conflicts were detected, method 300 continues from block 318 to block 324. In block 324, the system is capable of creating a boot image for the design.

In one aspect, as part of block 324, the system is capable of determining which applications and/or libraries of the design are to be implemented in the heterogeneous device during the boot process. Such applications and/or libraries will have been implemented within the heterogeneous device upon completion of the boot process. The boot process refers to a startup process performed by the device after reset or after power cycling. In generating the boot image, the system is capable of including within the boot image only those applications and/or libraries that are to be loaded into the heterogeneous device as part of the boot process. The system omits from the boot image those applications and/or libraries not to be implemented in the heterogeneous device as part of, e.g., during, the boot process.

In block 326, the system is capable of running debugging. In block 328, the system determines whether to add another application to the design. For example, the system may display a user interface querying the user as to whether another application is to be added to the design. In response to receiving a user input indicating that another application is to be added, method 300 loops back to block 304 to continue processing. In response to receiving a user input indicating that no further application is to be added to the design, method 300 continues to block 330.

In block 330, the system is capable of performing system performance analysis. The system is capable of simulating the design, for example, to measure one or more performance metrics of the design. In block 332, the system determines whether the design meets one or more predetermined requirements. For example, the system is capable of comparing the performance metrics determined in block 330 with the predetermined requirements to determine whether the design meets the predetermined requirements. In response to determining that the design meets the predetermined requirements, method 300 may end. In response to determining that the design does not meet the predetermined requirements, method 300 is capable of looping back to block 320 to continue processing.

FIG. 4 illustrates an example user interface 400 that may be generated by a computer system (system) to create a specification for a boot image for a heterogeneous device. For example, a system as described in connection with FIG. 9 executing one or more EDA applications is capable of generating a user interface the same as or similar to that shown in FIG. 4.

User interface 400 allows a user to list the different applications and/or libraries for a particular design for a device such as device 100 of FIG. 1, e.g., a heterogeneous device. Via user interface 400, the user is capable of specifying which domain each of the applications and/or libraries is assigned. Further, via the user interface, a user can specify selected ones of the applications and/or libraries that are to be booted by the device at boot time.

In the example of FIG. 4, user interface 400 includes columns corresponding to "Application," "Build Config." corresponding to "Build Configuration," "Domain," "Processor," "OS" corresponding to "Operating System," "Build Dependency," and "Boot on Startup." In the example of FIG. 4, the user has provided the information shown to describe a design. The example design described in user interface 400 includes four different applications and two libraries. Each application and/or library includes different attributes that define the domain to which the application belongs, the processor of the domain, the operating system (if any) used in the domain, any build dependencies of the application and/or library, and whether the application and/or library is to be booted by the device at startup.

For example, the domain "linux_on_a72" includes a "psv_cortexa72" processor. The domain linux_on_a72 executes a Linux operating system. The libraries video_lib and stream_lib belong to the domain as does the application video_processing_app. The libraries video_lib and stream_lib in the example of FIG. 4 are hardware accelerated programs or kernels that are implemented in PL 104 (e.g., configuration bitstreams). The application video_processing_app is dependent on the video_lib and the stream_lib libraries. In the example of FIG. 4, the libraries themselves (e.g., video_lib and stream_lib) need not be a part of the boot image. Still, these libraries are required by the application in order to compile.

The system, for example, can automatically detect one or more design build dependencies. The user is capable of specifying one or more build dependencies through user interface 400 of FIG. 4. The system ensures that the applications and/or libraries are built in an order that conforms or honors the specified dependencies.

In an example implementation, the system is capable of detecting the dependency between applications and/or between an application and one or more libraries specifying circuit(s) to be implemented in PL 104 (e.g., based on the user provided data of FIG. 4). In that case, the system is capable of determining that the library is available for compiling the application. In response to determining that the library is not available (e.g., that the library (e.g., core) has not been added to the design or is not specified by or in the platform), the system is capable of generating a notification specifying an error (e.g., unavailability of the library). In one aspect, this check may be performed by the system as part of block 306 of FIG. 3 prior to building the application having the dependency.

Referring to the example of FIGS. 1 and 2, the psv_cortexa72 processor may be implemented as APU 204 (e.g., CPU 236). The domain "DPE" includes one or more DPEs as described in connection with FIG. 1. The DPE domain includes a classifier application and a multiplier application. The DPEs need not execute an operating system such as Linux, but rather may directly execute program code and operate under control of a DPE runtime, which is indicated as the operating system.

The domain "freeRTOS_on_r5_0" may include a "psv_cortex_r5_0" processor. The processor may execute the FreeRTOS operating system. The heartbeat_app belongs to this domain. In one aspect, the psv_cortex_r5_0 processor may be implemented as RPU 202 of FIG. 2.

In the example of FIG. 4, only the classifier application to be implemented in the DPE domain (e.g., in the DPE array) and the heartbeat_app application run on the psv_cortex_r5_0 are designated for booting at startup of the device. For that reason, the system includes the classifier application and the heartbeat_app application in the boot image that is generated by the system for the design. The system excludes the other applications and/or libraries (e.g., those with a "No" in the "Boot on Startup" column) from the boot image for the system that is generated.

In another example implementation, the system may generate user interface 400 with all columns except the "Boot on Startup" column filled in with data automatically detected from the respective applications of the design. For example, the system may detect the information of user interface 400 automatically from metadata of the respective applications of the design and present user interface 400 with largely populated with data. The last column may be empty. The user may then specify whether the various applications and/or libraries are to be included in the boot image based on whether a "Yes" or "No" is provided in each respective row of the "Boot on Startup" column. The data provided is used as a specification by the system for creating the boot image for the design.

Figure 5:
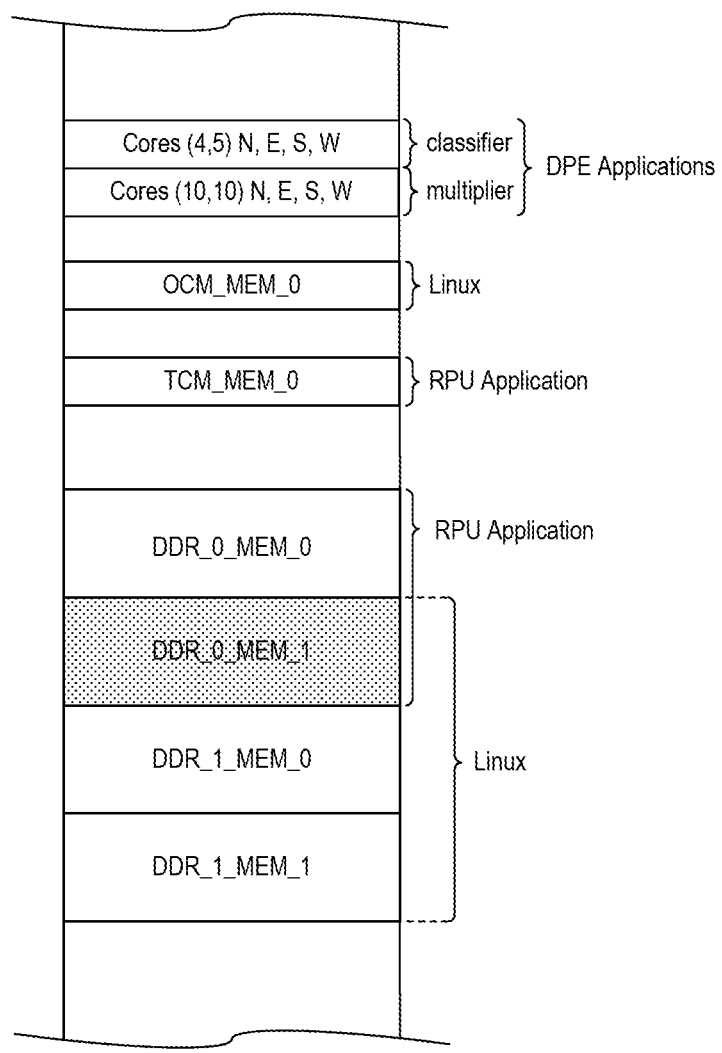
FIG. 5 illustrates an example of a memory overlap type of conflict between applications of a design for a heterogeneous device.

FIG. 5 illustrates an example of a memory overlap type of conflict between applications. FIG. 5 illustrates an example of the analysis performed by the system on a design for a heterogeneous device. In the example of FIG. 5, the system is capable generating a user interface as depicted in FIG. 5. In the example of FIG. 5, a view of a memory 500 is shown that represents the physical memory (e.g., all the physical memory) available to the heterogeneous device. For example, memory 500 represents on-chip memories and memories located on the particular circuit board on which the heterogeneous device is coupled (e.g., mounted). In the example, memory 500 represents RAM (e.g., DDR) that may be located on the circuit board with the heterogeneous device, OCM, and TCM.

The system is capable of determining the allocation of applications to the physical memory as illustrating the allocation as pictured in FIG. 5. In the example of FIG. 5, the classifier and multiplier applications are labeled as DPE applications. Each of the classifier and multiplier applications is allocated to a region of memory (e.g., the memory module) of the particular DPE(s) in which the applications are to execute. For example, the classifier application is stored in the program memory of the DPE core at location (4,5) in the DPE array (e.g., using an x-y coordinate system). The classifier application is stored in the program memory of the DPE core at location (10,10) of the DPE array. The OCM (illustrated as OCM_MEM_0) is part of the Linux domain. The TCM (illustrated as TCM_MEM_0) stores the program executed by the RPU.

In the example of FIG. 5, the DDR memory has a DDR_0 module and a DDR_1 module. Each DDR module is segmented into multiple parts corresponding to "MEM_0" and "MEM_1" in this example. The RPU application is allocated to DDR_0_MEM_0 and to DDR_0_MEM_1. The Linux domain is allocated to DDR_0_MEM_1, DDR_1_MEM_0, and DDR_1_MEM_1. The user interface depicts the overlap between the RPU application and the Linux domain in DDR_0_MEM_1 (where the overlap is shown with shading).

The example user interface illustrated in FIG. 5 may be presented to a user subsequent to an analysis performed by the system. In one aspect, the user interface is an example of a notification that may be provided. It should be appreciated that FIG. 5 is presented for purposes of illustration only and that overlap type conflicts detected by the system may be presented to the user in any of a variety of different formats (e.g., as text, speech, or another visualization).

Figure 6:
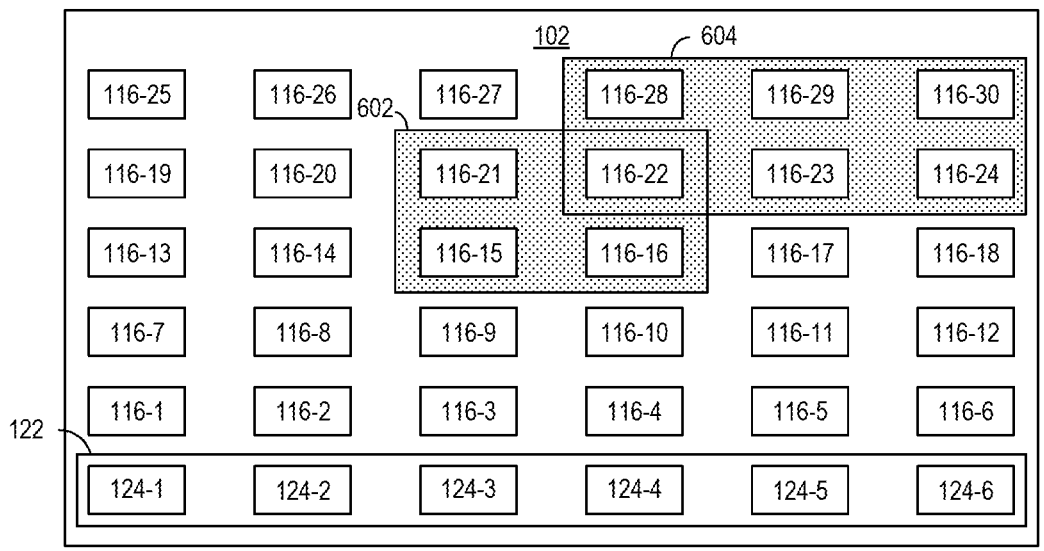
FIG. 6 illustrates an example of an overlap type of conflict between applications of a design designated for implementation in a data processing engine array.

FIG. 6 illustrates an example of an overlap type of conflict between applications in DPE array 102. FIG. 6 illustrates an example of a type of conflict that the system is capable of detecting in block 306 of FIG. 3.

In the example of FIG. 6, an application 602 designated to execute in DPE array 102 is assigned, or mapped, to DPEs 116-15, 116-16, 116-21, and 116-22. Another application 604 designated to execute in DPE array 102 is assigned, or mapped, to DPEs 116-22, 116-23, 116-24, 116-28, 116-29, and 116-30. Both applications 602 and 604, which run in DPE array 102 concurrently in this example, are mapped to, or use, DPE 116-22 causing a conflict since any DPE 116 cannot be used for two or more different applications concurrently.

Figure 7:
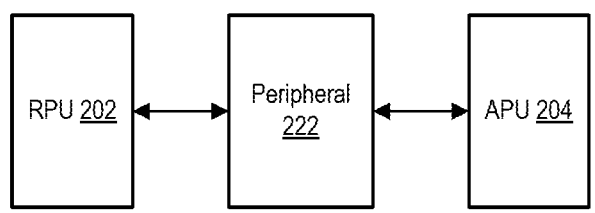
FIG. 7 illustrates an example of a peripheral type of conflict among applications of a design for a heterogeneous device.

FIG. 7 illustrates an example of a peripheral type of conflict among applications. FIG. 7 illustrates an example of a type of conflict that the system is capable of detecting in block 312 of FIG. 3. In the example of FIG. 7, the system detects that two different processors (and domains) are accessing the same peripheral. RPU 202 and APU 204 each accesses a particular peripheral 222 (e.g., a USB port or the like). Other similar examples of such conflicts include two different processors (and different domains) accessing another circuit block such as a hardwired circuit block as described in connection with FIG. 1, a memory controller, or the like.

Figure 8:
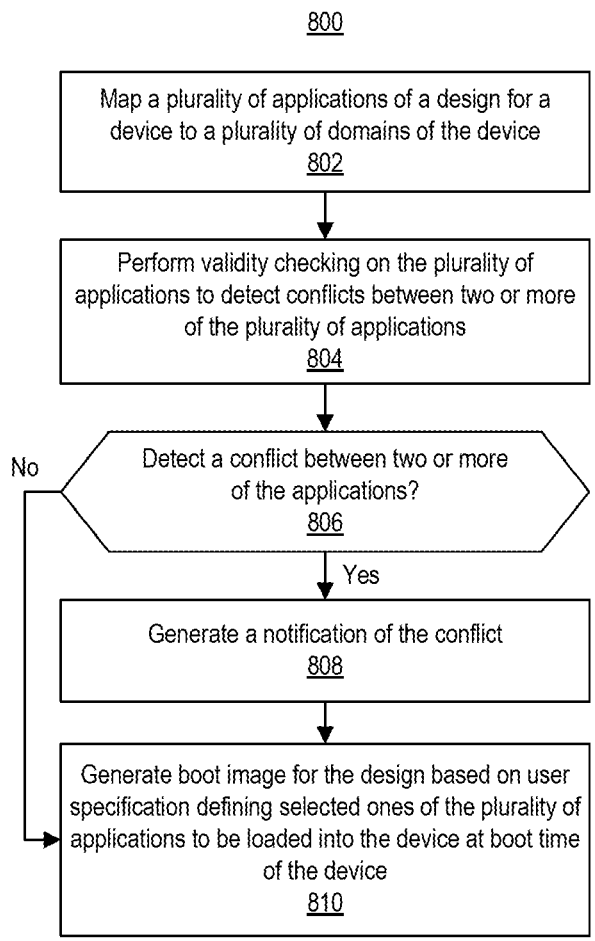
FIG. 8 illustrates another example method of implementing a design for a heterogeneous device.

FIG. 8 illustrates another example method 800 of implementing a design for a heterogeneous device. Method 800 may be implemented using a computer system (system) as described herein in connection with FIG. 9. Method 800 may begin in a state where one or more users have developed a design for a device such as device 100 of FIG. 1, e.g., a heterogeneous device. For example, as part of creating the design, the user(s) may have created a specification for the design as described in connection with FIG. 3 for use in generating the boot image.

In block 802, the system is capable of mapping a plurality of applications and/or libraries of a design for a device to a plurality of domains of the device. Each of the domains can include a different compute unit. The compute units may include processors and/or DPEs. In an example implementation, the system is capable of detecting metadata from the applications that indicate which domain of the device each of the various applications is to execute.

In block 804, the system is capable of performing validity checking on the plurality of applications to detect conflicts between two or more of the plurality of applications. For example, the system is capable of performing validity checking as described in connection with blocks 306 and/or 312 of FIG. 3.

In block 806, the system is capable of detecting a conflict between two or more of the applications. In response to detecting one or more conflicts between the applications, method 800 proceeds to block 808. In response to detecting no conflicts between the applications, method 800 may proceed directly to block 810. In block 808, the system is capable of generating a notification of the conflict(s) that were detected.

In block 810, the system is capable of generating a boot image for the design based on the user specification defining selected ones of the plurality of applications to be loaded into the device at boot time for the device.

The foregoing and other implementations can each optionally include one or more of the following features, alone or in combination. Some example implementations include all the following features in combination.

In one aspect, the user specification indicates a dependency between an application of the plurality of applications and a library specifying a circuit to be implemented in programmable logic. The method may include determining that the library is available for compiling the application and, in response to determining that the library is not available, generating a notification specifying an error.

In another aspect, the conflict includes a first application of the plurality of applications and a second application of the plurality of applications assigned to execute on a same compute unit. The compute unit may be a processor. Further, at least one of the first application or the second application is a bare metal application.

In another aspect, the conflict includes a first application of the plurality of applications and a second application of the plurality of applications overlapping in runtime memory of the device.

In another aspect, the conflict includes a first application of the plurality of applications and a second application of the plurality of applications using a same circuit block, e.g., peripheral, of the device. In another aspect, the circuit block may be a DPE of a DPE array.

In another aspect, a system having a processor is capable of initiating and/or performing the various operations described within this disclosure. In still another aspect, a computer program product includes one or more computer readable storage media, and program instructions collectively stored on the one or more computer readable storage media, wherein the program instructions are executable by computer hardware to initiate the various operations described within this disclosure.

Figure 9:
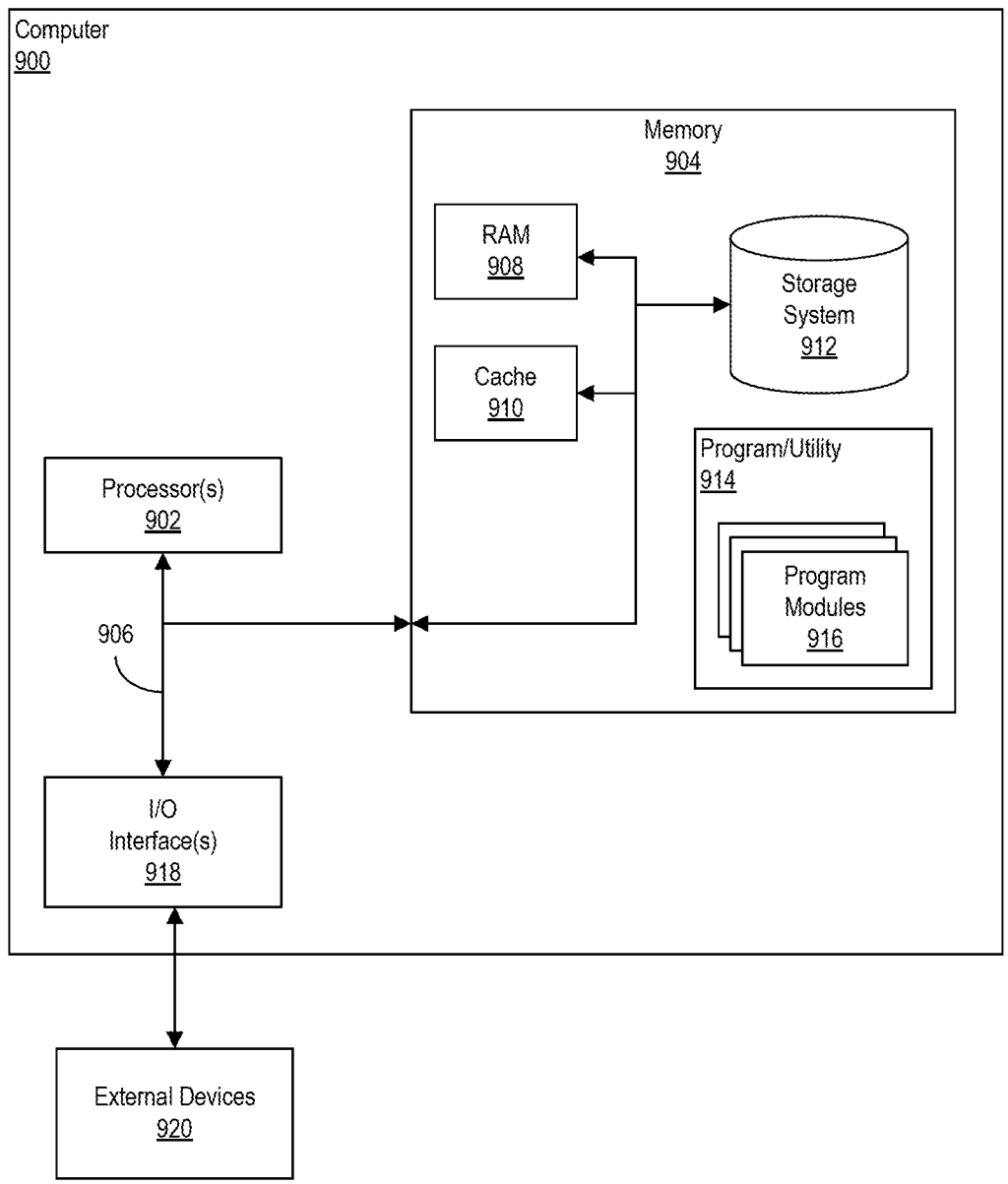
FIG. 9 illustrates an example of a computer system capable of performing the operations described within this disclosure.

FIG. 9 illustrates an example computer 900 for use with the inventive arrangements described within this disclosure. Computer 900 can include one or more processors 902 (e.g., central processing units), a memory 904, and a bus 906 that couples various system components including memory 904 to processor(s) 902. Processor(s) 902 may include any of a variety of processors that are capable of executing program code. Example processor types include, but are not limited to, processors having an x86 type of architecture (IA-32, IA-64, etc.), Power Architecture, ARM processors, and the like.

Bus 906 represents one or more of any of several types of communication bus structures, including a memory bus or memory controller, a peripheral bus, an accelerated graphics port, and a processor or local bus using any of a variety of available bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer 900 typically includes a variety of computer readable media. Such media may be any available media that is accessible by computer 900 and may include any combination of volatile media, non-volatile media, removable media, and/or non-removable media.

Memory 904 may include computer readable media in the form of volatile memory, such as random-access memory (RAM) 908 and/or cache memory 910. Computer 900 may also include other removable/non-removable, volatile/non-volatile computer system storage media. By way of example, storage system 912 may be provided for reading from and writing to a non-removable, non-volatile magnetic media and/or solid state drive (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each may be connected to bus 906 by one or more data media interfaces. As will be further depicted and described below, memory 904 may include at least one computer program product having a set (e.g., at least one) of program modules (e.g., program code) that are configured to carry out the functions and/or operations described within this disclosure.

For example, program/utility 914, having a set (at least one) of program modules 916 which may include, but are not limited to, an operating system, one or more application programs (e.g., EDA applications), other program modules, and/or program data, is stored in memory 904. Program modules 916 generally carry out the functions and/or methodologies as described herein at least with respect to operations performed by computer 900. For example, program modules 916 may implement an EDA application capable of performing the operations described herein relating to implementing a design for a heterogeneous device.

Program/utility 914 is executable by processor(s) 902. Program/utility 914 and any data items used, generated, and/or operated upon by processor(s) 902 are functional data structures that impart functionality when employed by processor(s) 902. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer 900 may include one or more Input/Output (I/O) interfaces 918 communicatively linked to bus 906. In one aspect, I/O interface(s) 918 may include hardware controllers that allow computer 900 to communicate with external devices 920 where external devices 920 allow a user to interact with computer 900. For example, in that case, external devices may include a keyboard, a mouse, and/or a display. In other cases, I/O interfaces 128 may include, but are not limited to, network cards, modems, network adapters, etc. that allow computer 900 to communicate with one or more other systems.

FIG. 9 is not intended to suggest any limitation as to the scope of use or functionality of the examples described herein. Computer 900 is an example of computer hardware (e.g., a system) that is capable of performing the various operations described within this disclosure. Computer 900 can be practiced as a standalone device, as a bare metal server, in a cluster, or in a distributed cloud computing environment. In a distributed cloud computing environment, tasks are performed by remote processing devices that are linked through a communications network. In a distributed cloud computing environment, program modules may be located in both local and remote computer system storage media including memory storage devices.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service. Other examples of cloud computing models are described in the National Institute of Standards and Technology (NIST) and, more particularly, the Information Technology Laboratory of NIST.

Computer 900 may be operational with numerous other general-purpose or special-purpose computing system environments or configurations. Examples of computing systems, environments, and/or configurations that may be suitable for use with computer 900 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. The term "user" can refer to a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "processor" means at least one circuit capable of carrying out instructions contained in program code. The circuit may be an integrated circuit or embedded in an integrated circuit.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow.

It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:
   mapping, using computer hardware, a plurality of applications of a design for an integrated circuit to a plurality of hardware domains of the integrated circuit, wherein each hardware domain includes a different compute unit, wherein the mapping is performed during development of the design;
   performing, using the computer hardware, validity checking on the plurality of applications during development of the design;
   wherein the validity checking includes checking for conflicts among the plurality of applications including whether a first application of the plurality of applications and a second application of the plurality of applications, when loaded into the integrated circuit as part of the design, use a same circuit block of a hardware domain of the integrated circuit;
   detecting, using the computer hardware, a conflict between the first application and the second application based on the validity checking; and
   in response to the detecting, generating a notification of the conflict using the computer hardware.

2. The method of claim 1, further comprising:
   generating a boot image for the design based on a user specification defining selected ones of the plurality of applications to be loaded at boot of the integrated circuit.

3. The method of claim 2, wherein the user specification indicates a dependency between an application of the plurality of applications and a library specifying a circuit to be implemented in programmable logic, the method further comprising:
   in response to determining that the library is not available, generating a notification specifying an error.

4. The method of claim 1, wherein the conflict includes the first application and the second application assigned to execute on a same compute unit.

5. The method of claim 4, wherein at least one of the first application or the second application is a bare metal application.

6. The method of claim 1, wherein the conflict includes the first application and the second application overlapping in runtime memory of the integrated circuit.

7. The method of claim 1, wherein the circuit block is a data processing engine of a data processing engine array.

8. A system, comprising:
   a processor configured to initiate operations including:
      mapping a plurality of applications of a design for an integrated circuit to a plurality of hardware domains of the integrated circuit, wherein each hardware domain includes a different compute unit, wherein the mapping is performed during development of the design;
      performing validity checking on the plurality of applications during development of the design;
      wherein the validity checking includes checking for conflicts among the plurality of applications including whether a first application of the plurality of applications and a second application of the plurality of applications, when loaded into the integrated circuit as part of the design, use a same circuit block of a hardware domain of the integrated circuit;
      detecting a conflict between the first application and the second application based on the validity checking; and
      in response to the detecting, generating a notification of the conflict.

9. The system of claim 8, wherein the processor is configured to initiate operations further comprising:
   generating a boot image for the design based on a user specification defining selected ones of the plurality of applications to be loaded at boot of the integrated circuit.

10. The system of claim 9, wherein the user specification indicates a dependency between an application of the plurality of applications and a library specifying a circuit to be implemented in programmable logic, wherein the processor is configured to initiate operations further comprising:
    in response to determining that the library is not available, generating a notification specifying an error.

11. The system of claim 8, wherein the conflict includes the first application and the second application assigned to execute on a same compute unit.

12. The system of claim 11, wherein at least one of the first application or the second application is a bare metal application.

13. The system of claim 8, wherein the conflict includes the first application and the second application overlapping in runtime memory of the integrated circuit.

14. The system of claim 8, wherein the circuit block is a data processing engine of a data processing engine array.

15. A computer program product, comprising:
    one or more non-transitory computer readable storage media, and program instructions collectively stored on the one or more computer readable storage media, wherein the program instructions are executable by computer hardware to initiate operations including:
       mapping a plurality of applications of a design for an integrated circuit to a plurality of hardware domains of the integrated circuit, wherein each hardware domain includes a different compute unit, wherein the mapping is performed during development of the design;

performing validity checking on the plurality of applications during development of the design;

wherein the validity checking includes checking for conflicts among the plurality of applications including whether a first application of the plurality of applications and a second application of the plurality of applications, when loaded into the integrated circuit as part of the design, use a same circuit block of a hardware domain of the integrated circuit;

detecting a conflict between the first application and the second application based on the validity checking; and in response to the detecting, generating a notification of the conflict.

16. The computer program product of claim 15, wherein the program instructions are executable by the computer hardware to initiate operations further comprising:

generating a boot image for the design based on a user specification defining selected ones of the plurality of applications to be loaded at boot of the integrated circuit.

17. The computer program product of claim 15, wherein the conflict includes the first application and the second application assigned to execute on a same compute unit.

18. The computer program product of claim 15, wherein the conflict includes the first application and the second application overlapping in runtime memory of the integrated circuit.

19. The computer program product of claim 17, wherein at least one of the first application or the second application is a bare metal application.

20. The computer program product of claim 15, wherein the circuit block is a data processing engine of a data processing engine array.

* * * * *